United States Patent
Trostle et al.

[11] Patent Number: 6,019,410
[45] Date of Patent: Feb. 1, 2000

[54] FOLD OUT BED EXTENDER

[75] Inventors: Mark C. Trostle, Clarkston; Carl Mather, Lake Orion; Nigel Giddons, Royal Oak; David H. Walter, Troy, all of Mich.

[73] Assignee: DaimlerChrysler, Auburn Hills, Mich.

[21] Appl. No.: 09/343,835

[22] Filed: Jun. 30, 1999

[51] Int. Cl.$^7$ ................................................. B62D 33/08
[52] U.S. Cl. ................................................. 296/26.11
[58] Field of Search ........................... 296/26.08, 26.11

[56] References Cited

U.S. PATENT DOCUMENTS

| | | | |
|---|---|---|---|
| 824,779 | 7/1906 | Clark | 224/538 |
| 1,366,771 | 1/1921 | Devencenzi | 296/26.09 |
| 1,730,480 | 10/1929 | Shirreff | 414/522 |
| 2,729,499 | 1/1956 | Eggum | 296/26 |
| 2,784,027 | 3/1957 | Temp | 296/23 |
| 2,852,303 | 9/1958 | Hopson | 296/26 |
| 3,900,118 | 8/1975 | Kellogg | 214/84 |
| 4,389,067 | 6/1983 | Rubio | 296/50 |
| 4,472,639 | 9/1984 | Bianchi | 296/26.11 |
| 4,475,760 | 10/1984 | Morgan | 296/26 |
| 4,938,403 | 7/1990 | Cortelli | 2214/310 |
| 4,950,123 | 8/1990 | Brockhaus | 414/522 |
| 4,951,991 | 8/1990 | Haigler | 296/26 |
| 5,120,102 | 6/1992 | Cumbie | 296/3 |
| 5,320,397 | 6/1994 | Peterson et al. | 296/57.1 |
| 5,415,506 | 5/1995 | Payne | 410/129 |
| 5,468,037 | 11/1995 | Peterson et al. | 296/57.1 |
| 5,478,130 | 12/1995 | Matulin et al. | 296/57.1 |
| 5,509,709 | 4/1996 | Carroll | 296/3 |
| 5,564,767 | 10/1996 | Strepek | 296/26 |
| 5,700,047 | 12/1997 | Leitner et al. | 296/26 |
| 5,735,565 | 4/1998 | Papai et al. | 296/39.2 |
| 5,741,039 | 4/1998 | Habdas | 296/57.1 |
| 5,775,759 | 7/1998 | Cummins | 296/26.11 |
| 5,788,311 | 8/1998 | Tibbals | 296/26.11 |
| 5,857,724 | 1/1999 | Jarman | 296/26.11 |

*Primary Examiner*—G. Hoge
*Attorney, Agent, or Firm*—Mark P. Calcaterra

[57] ABSTRACT

A fold out bed extender for a motor vehicle includes a rear panel, a first set of swing panels and a second set of swing panels articulable from a stowed position to an operable position. Each set of swing panels preferably has a leading panel, a trailing panel and a hinge pivotally interconnecting the leading panel and trailing panels. Each leading panel is adapted to be pivotally attached to the bed of the vehicle and each trailing panel is detachably coupled to the rear panel when the first and second sets of swing panels are in the operable position.

12 Claims, 5 Drawing Sheets

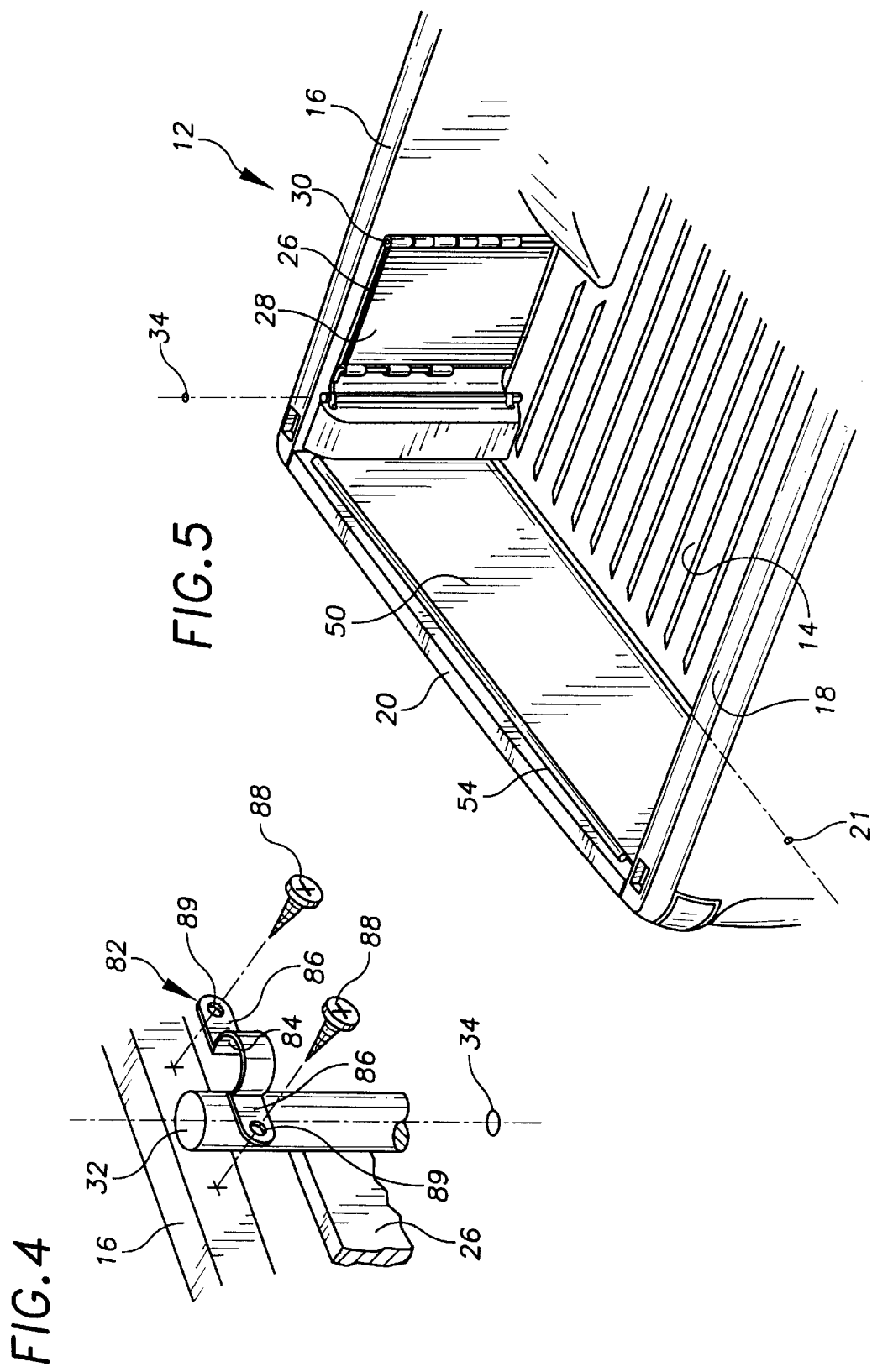

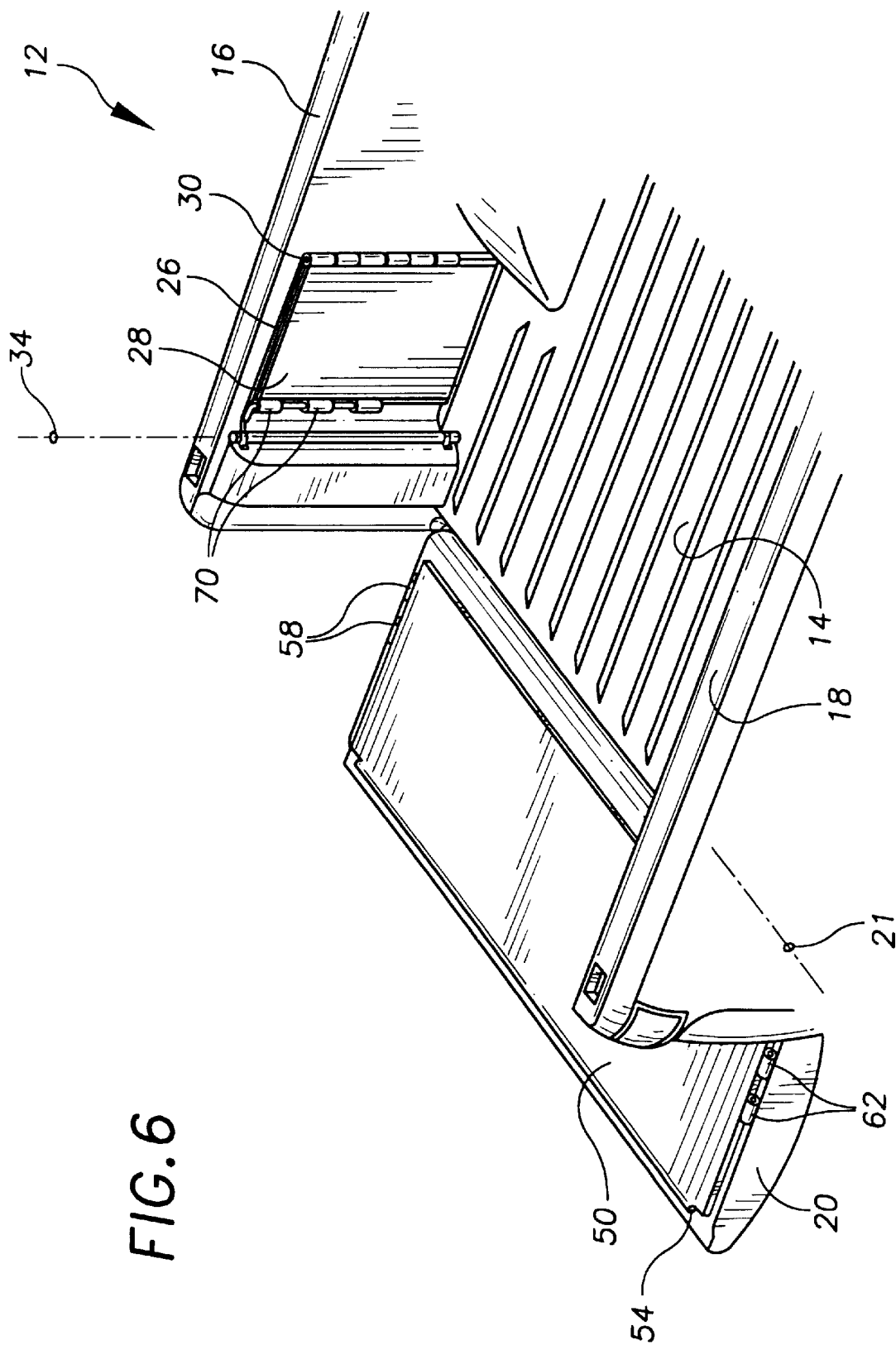

FOLD OUT BED EXTENDER

BACKGROUND OF THE INVENTION

1. Technical Field

The present invention generally relates to motor vehicles. More particularly, the present invention pertains to a mechanism for extending the bed of a cargo-carrying vehicle equipped with a tailgate.

2. Discussion

Operators of cargo-carrying vehicles such as pickup trucks often have a need to temporarily increase the amount of cargo space available to them. For example, an operator hauling voluminous materials such as wood chips for landscaping would benefit from an increase in volumetric capacity. Similarly, when items longer than the bed are to be carried, operators would benefit from an increase in bed area. Currently, attempts to haul bulky items often include leaving the tailgate in the lowered or open position.

Hauling cargo with the tailgate in an open position creates a variety of problems. In some cases, additional efforts must be made to secure the cargo within the truck bed. These efforts are time consuming and sometimes ineffective. For example, certain types of cargo such as gravel or sand do not lend themselves to binding or lashing. Accordingly, transporting this type of cargo creates the further difficulty of creating a possible safety hazard when the cargo leaves the hauling vehicle and enters the road.

Existing structures such as the "Tailgate Attachment for Extending the Cargo Space of Vehicles" of U.S. Pat. No. 4,472,639 have been designed for the purpose of extending the cargo space of trucks and other vehicles. However, these devices have certain disadvantages. In some cases, unwieldy structures are temporarily installed into the bed of the vehicle only having to be removed and stored in a separate location when not in use. In other cases, the device interferes with normal day-to-day use of the vehicle when a bed extender is not required. In still other cases, the device fails to provide a storage area capable of preventing small items from falling out of the cargo area during transport.

SUMMARY OF THE INVENTION

It is therefore an object of the present invention to provide a fold out bed extender integrally packaged within the box of a cargo-carrying vehicle.

It is another object of the present invention to provide a fold out bed extender for use in new or currently used vehicles.

It is yet another object of the present invention to minimize interference with the type of use where a bed extender is not required.

According to the present invention, a fold out bed extender for a motor vehicle includes a rear panel, a first set of swing panels and a second set of swing panels articulable from a stowed position to an operable position. Each set of swing panels has a leading panel, a trailing panel and a hinge pivotally interconnecting the leading and trailing panels. Each leading panel includes means for pivotal attachment and each trailing panel is detachably coupled to the rear panel when the first and second sets of swing panels are in the operable position.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 4 is an exploded perspective view of the saddle clamp of the present invention;

FIG. 5 is another perspective view similar to FIG. 1, illustrating the fold out bed extender in a stowed position and the vehicle tailgate in a closed position; and FIG. 6 is a final perspective view similar to FIG. 1, illustrating the fold out bed extender in a stowed position with the vehicle tailgate in an open position.

DETAILED DESCRIPTION OF THE PREFERRED EMBODIMENT

Figure 1:
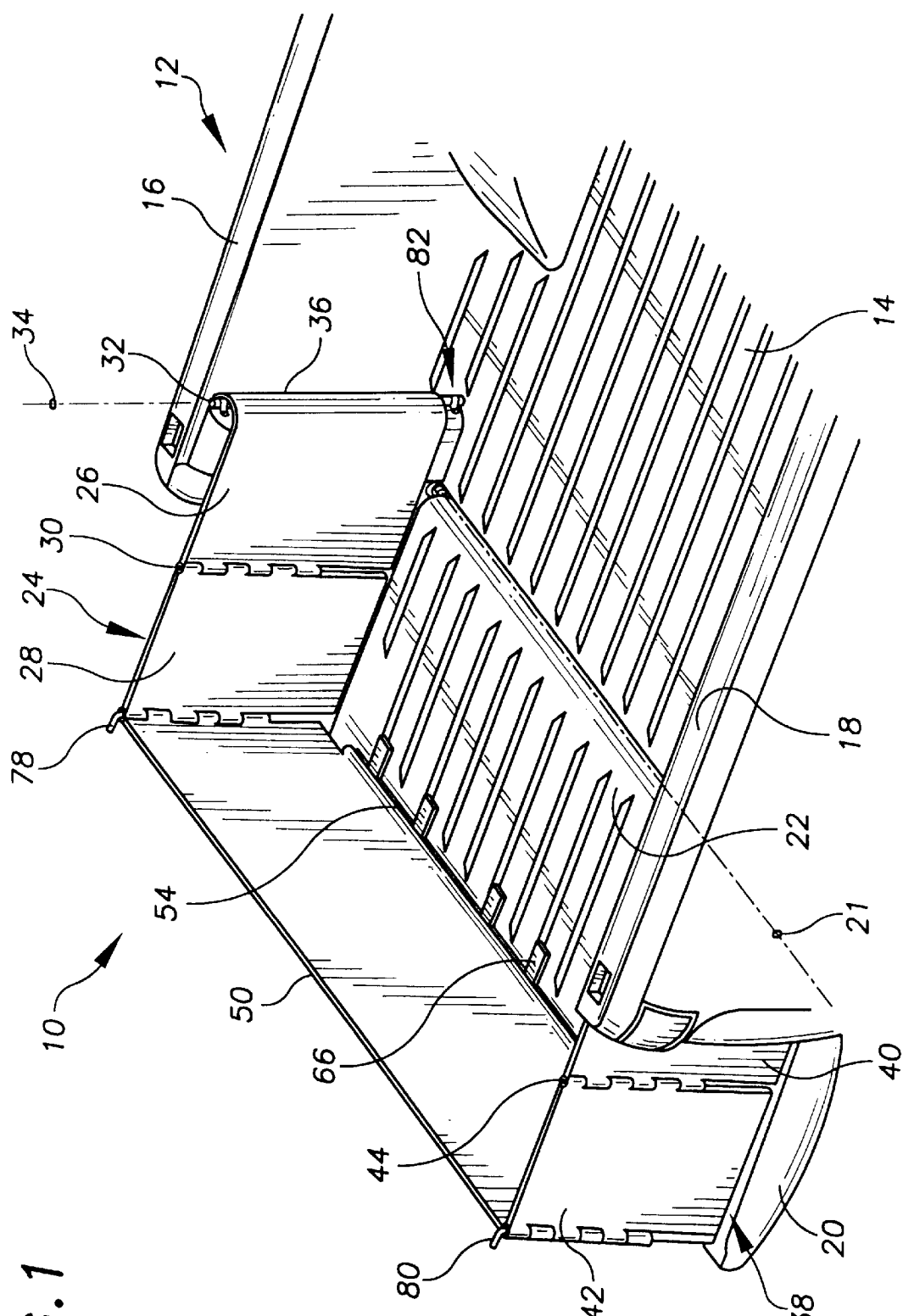
FIG. 1 is a perspective view of a portion of a motor vehicle illustrating the fold out bed extender of the present invention in an operable position.

With reference to the drawings, a fold out bed extender constructed in accordance with the teachings of an embodiment of the present invention is generally identified at reference numeral 10. The bed extender 10 is shown operatively associated with an exemplary motor vehicle 12. In the preferred embodiment, the vehicle 12 is a pickup truck having a bed 14, a first sidewall 16, a second sidewall 18, and a tailgate 20 which can be pivoted about an axis 21 from an open position to a closed position as shown in FIGS. 5 and 6. When the tailgate 20 is in the open position, an inner surface 22 is substantially coplanar with bed 14.

Figure 2:
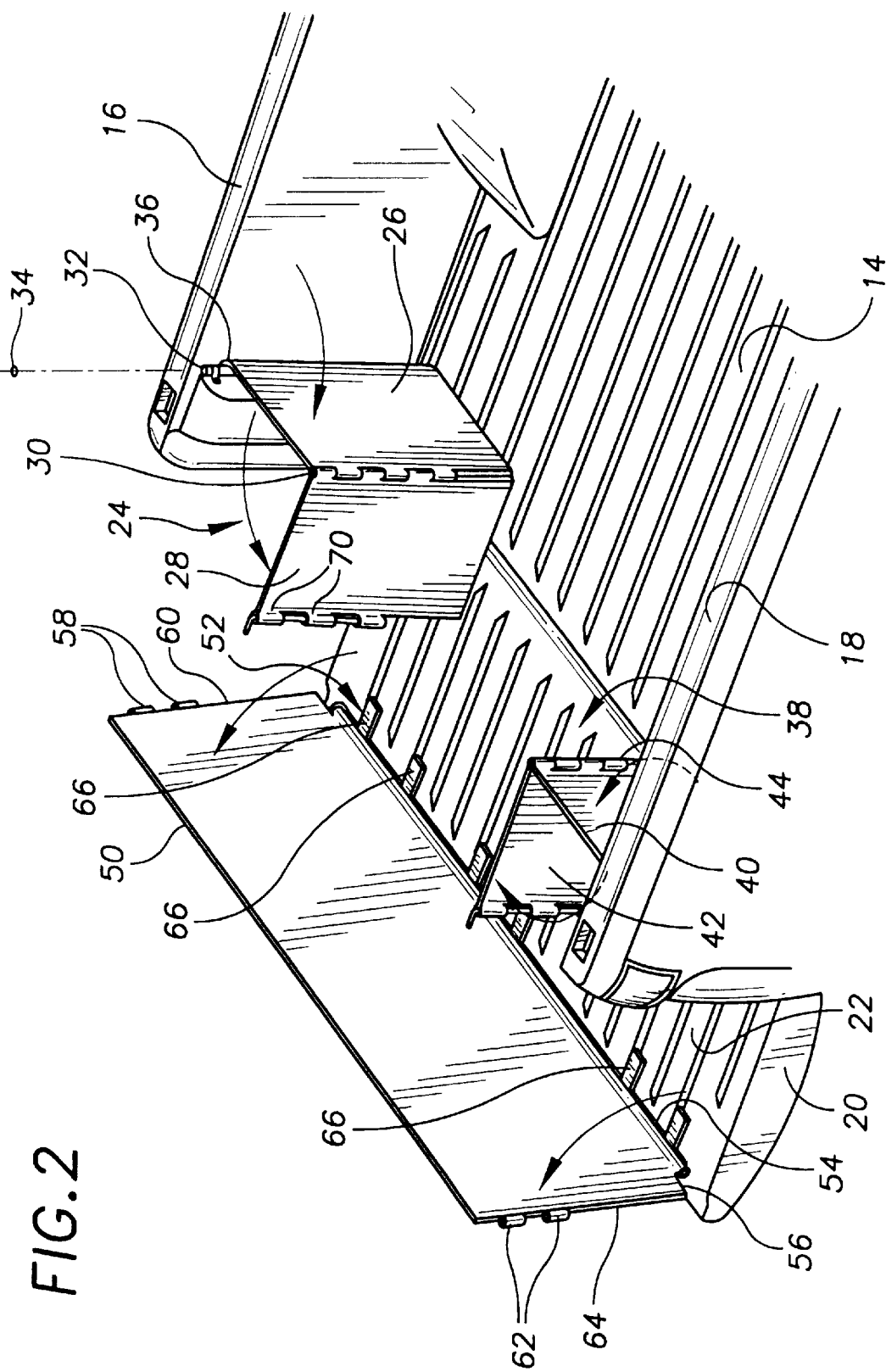
FIG. 2 is a perspective view similar to FIG. 1, illustrating the fold out bed extender in a first partially assembled position.

The fold out bed extender 10 is illustrated to generally include three separate subassemblies individually attached to vehicle 12. As particularly shown in FIG. 2, the first subassembly comprises a first set of swing panels 24 including a generally rectangular leading panel 26, a generally rectangular trailing panel 28 and a hinge 30 for rotatably interconnecting leading panel 26 and trailing panel 28. The leading panel 26 includes an inwardly extending flange 36 having a pair of axially extending trunnions 32 located on an edge of flange 36 in order to facilitate attachment to the first sidewall 16 while providing a rotational degree of freedom about an axis 34.

One skilled in the art will appreciate that the second subassembly comprises a second set of swing panels 38 which is substantially the mirror image of first set of swing panels 24. Accordingly, second set of swing panels 38 includes a leading panel 40 and a trailing panel 42 rotatably interconnected by a hinge 44. The leading panel 40 also includes an inwardly extending flange 46 having a pair of trunnions 48 for rotatable mounting of the second set of swing panels 38 to the second sidewall 18.

The third subassembly of fold out bed extender 10 includes a rectangular rear panel 50, a tailgate clasp 52, and a hinge 54 rotatably interconnecting rear panel 50 and tailgate clasp 52. Rear panel 50 is generally rectangular in shape having dimensions similar to those of inner surface 22 of tailgate 20. The rear panel 50 is coupled to the hinge 54 at an edge 56 by a method commonly known in the art such as bolting, riveting or integral molding. The rear panel 50 further includes a pair of eyelets 58 protruding from a lateral edge 60 positioned in perpendicular relation to edge 56. Rear panel 50 further includes a second set of eyelets 62 protruding from a lateral edge 64.

The tailgate clasp 52 includes a number of planar attachment pads 66 each having mounting apertures (not shown) for attachment to inner surface 22 of tailgate 20. One skilled in the art will appreciate that while hinge 54 is shown as a single continuous component commonly referred to as a piano hinge, multiple small hinges may be used to interconnect the rear panel 50 with the tailgate 20 without departing from the scope of the invention.

In order to accomplish the goal of providing a fold out bed extender without interfering with normal vehicle operation, the rear panel 50 is very thin and preferably constructed from a lightweight composite material. In addition, the hinge 54 is constructed to allow the rear panel 50 to lay flush with the inner surface 22. Accordingly, any interference with the standard operation of vehicle 12 and access to bed 14 is limited to the thickness of rear panel 50.

Figure 3:
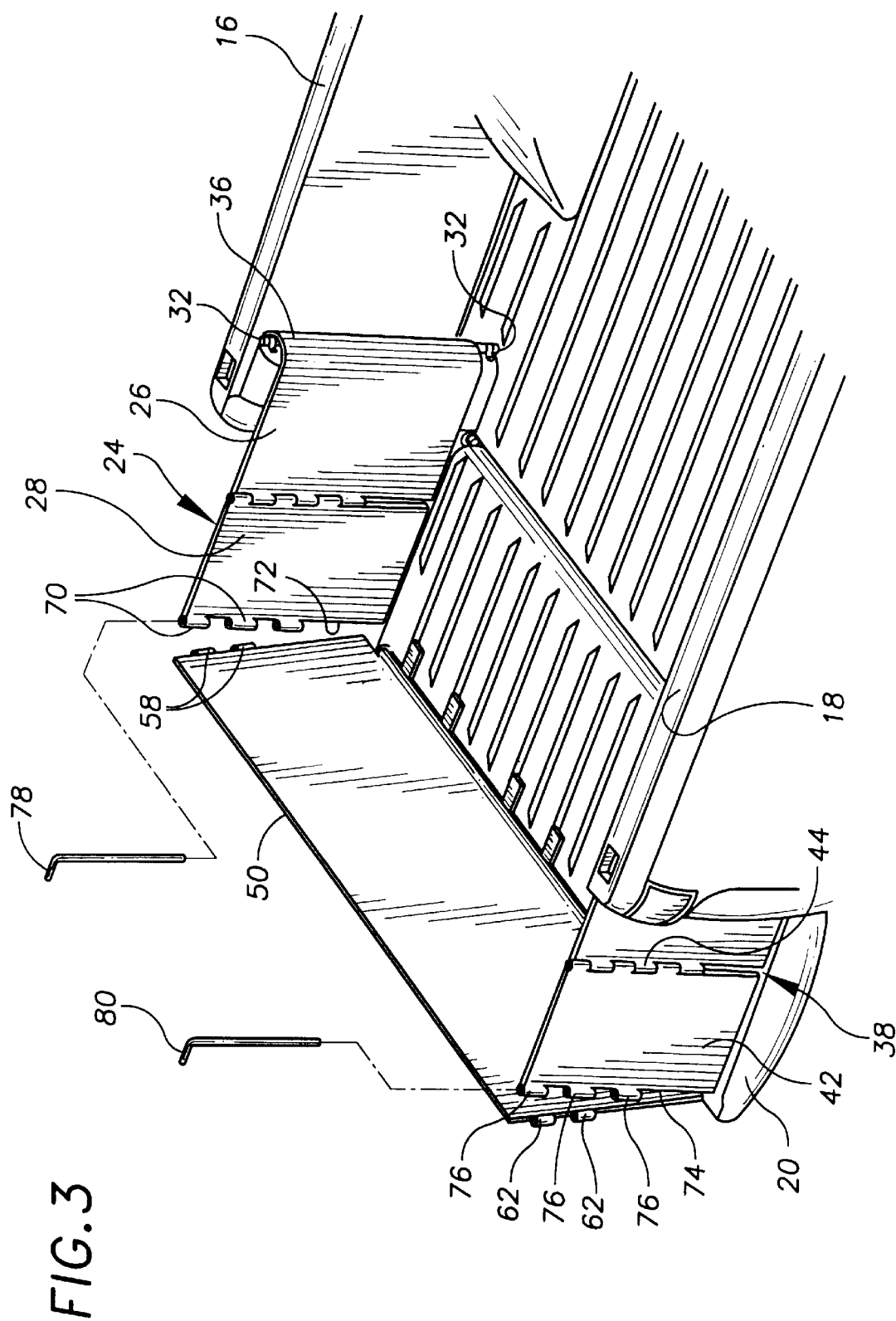
FIG. 3 is another perspective view similar to FIG. 1, illustrating the fold out bed extender in a second partially assembled position.

The first set of swing panels 24 and the second set of swing panels 38 are also generally planar, thin walled, panels preferably constructed from a composite material. As particularly shown in FIG. 3, a mechanism for interconnecting the trailing panel 28 with the rear panel 50 includes a set of eyelets 70 protruding from an edge 72 of the trailing panel 28. Similarly, the trailing panel 42 includes an edge 74 parallel to the hinge 44 having a set of eyelets 76 protruding therefrom. In order to dovetail the swing panel assemblies with rear panel 50, eyelets 70 and 76 are positioned in offset relation to rear panel eyelets 58 and 62. More particularly, each of the three subassemblies are interconnected by aligning the first set of swing panel eyelets 70 with the rear panel eyelets 58 and separately aligning the second set of swing panel eyelets 76 with the rear panel eyelets 62. Securing pins 78 and 80 are subsequently disposed within each of the eyelets to interconnect rear panel 50 with first set of swing panels 24 and second set of swing panels 38.

Installation and operation of the fold out bed extender 10 will now be described in detail. Referring to FIG. 4, a saddle clamp 82 for rotatably attaching the leading panel 26 to the first sidewall 16 is shown. Specifically, the saddle clamp 82 includes an arcuate center section 84 and a pair of generally coplanar mounting flanges 86 protruding therefrom. One skilled in the art will appreciate that the arcuate center section 84 is formed to generally complement the shape of trunnions 32 in order to provide a rotational degree of freedom about axis 34.

To install the first set of swing panels 24, the trunnion 32 is positioned in communication with arcuate center section 84. Self-tapping sheet metal screws 88 are disposed in apertures 89 and secured to first sidewall 16. In this manner, each of trunnions 32 are positioned and retained by a saddle clamp. One skilled in the art will appreciate that a variety of devices may be used to rotatably couple the leading panels 26 and 40 to the vehicle sidewalls 16 and 18 including bushings or bearings without departing from the scope of the invention. In addition, the manner of attachment previously disclosed permits the fold out bed extender 10 to be installed in a new vehicle or retrofitted to a pre-existing vehicle which originally lacked such a device.

Once each of the first and second set of swing panels 24 and 38 have been assembled to the respective sidewalls, the tailgate clasp 52 is coupled to the inner surface 22 using a method commonly known in the art such as bolting, riveting or welding, thereby completing the installation of the fold out bed extender 10.

Referring to FIGS. 5 and 6, the operation of the fold out bed extender 10 is explained by showing the bed extender in a stowed position. Specifically, the first set of swing panels 24 is stowed by rotating the trailing panel 28 about the hinge 30 until the trailing panel 28 is in contact with the leading panel 26. Both the leading panel 26 and the trailing panel 28 are then rotated about the axis 34 towards the first sidewall 16. One skilled in the art will appreciate that the first set of swing panels 24 may be detachably coupled to the first sidewall 16 by clips, straps, or snaps as commonly known in the art.

The second set of swing panels 38 are stowed in a similar manner. Specifically, the trailing panel 42 is articulated about the hinge 44 until the leading panel 40 and the trailing panel 42 are positioned adjacent one another. Both panels are subsequently rotated about the trunnions 48 toward the sidewall 18. At this time, the first and second set of swing panels 24 and 38 are in a stowed position as shown in FIGS. 5 and 6 and may be fastened to the sidewalls 16 and 18 as earlier mentioned.

The rear panel 50 is placed in a stowed position by simply rotating the rear panel 50 about the hinge 54 until contact with the tailgate inner surface 22 is made. With the fold out bed extender 10 in the stowed position as shown in FIGS. 5 and 6, the vehicle 12 functions as a standard pickup truck. Specifically, an operator may articulate the tailgate 20 from a closed position to an open position and vice versa without interference from the fold out bed extender 10.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A fold out bed extender for a motor vehicle having a bed defined by a pair of sidewalls and a tailgate, the bed extender comprising:

a rear panel;

a first set and second set of swing panels articulable from a stowed position to an operable position, each set of swing panels having a leading panel, a trailing panel and a hinge pivotally interconnecting said leading panel and said trailing panel;

each leading panel adapted for pivotal attachment to the motor vehicle, each trailing panel being detachably coupled to said rear panel when said first and second sets of swing panels are in said operable position.

2. The fold out bed extender for a motor vehicle of claim 1, further including a trunnion extending from an edge of each of said leading panels.

3. The fold out bed extender for a motor vehicle of claim 1, further including a laterally extending hinge for pivotal attachment of said rear panel to the tailgate.

4. The fold out bed extender for a motor vehicle of claim 3, wherein said rear panel is adapted to be articulable from a stowed position flush against the tailgate to an operable position perpendicular to the tailgate.

5. The fold out bed extender for a motor vehicle of claim 1, wherein said leading and trailing panels are substantially coplanar when in said operable position.

6. The fold out bed extender for a motor vehicle of claim 1, wherein said leading and trailing panels are positioned flush against one another when in said stowed position.

7. A fold out bed extender in combination with a vehicle having first and second spaced apart sidewalls, a bed and a tailgate articulable from an open position to a closed position, the tailgate having an inner surface substantially parallel to the bed when the tailgate is in the open position, the bed extender comprising:

a rear panel rotatably coupled to the inner surface of the tailgate; and a pair of swing panel sets, each set rotatably coupled to an associated one of the first and second sidewalls and releasably attachable to said rear panel when said tailgate is in said open position and said rear panel upwardly extends from said tailgate.

8. The fold out bed extender for a vehicle of claim 7, wherein each of said swing panel sets includes a leading panel pivotally connected to a trailing panel for relative rotation about a vertically extending pivot axis.

9. The fold out bed extender for a vehicle of claim 8, wherein said rear panel is positioned flush against said inner surface when said rear panel is in a stowed position.

10. The fold out bed extender for a vehicle of claim 8, wherein each of said trailing panels is positioned flush against an associated one of said leading panels and associated trailing and leading panels are positioned substantially flush against and parallel to a respective one of the sidewalls when said sets are in a stowed position.

11. The fold out bed extender for a vehicle of claim 8, wherein each leading panel has a pair of trunnions rotatably coupled to a sidewall using a saddle clamp.

12. A pick-up truck comprising:

a body defining a bed, the body including first and second laterally spaced apart sidewalls and a tailgate; and a fold out bed extender for increasing a volumetric capacity of the bed, the fold out bed extender including a rear panel and first and second side panels, said rear panel pivotally attached to a free end of said tailgate, said first and second side panels pivotally attached to said first and second sidewalls, respectively;

said fold out bed extender operative in a stored position in which said first and second side panels are flush against said first and second sidewalls, respectively, and said rear panel is flush against said tailgate, and further operative in an operative mode when said tailgate is horizontally oriented in which said rear panel upwardly extends from said tailgate, said first and second side panels rearwardly extend from said first and second sidewalls, respectively, said first and second side panels releasably attached to said rear panel.

* * * * *